United States Patent
Baehrle-Miller et al.

(10) Patent No.: US 12,447,941 B2
(45) Date of Patent: Oct. 21, 2025

(54) CONTROL METHOD FOR MOVING AN ELECTROMECHANICAL PARKING BRAKE

(71) Applicant: Robert Bosch GmbH, Stuttgart (DE)

(72) Inventors: Frank Baehrle-Miller, Schoenaich (DE); Vivek Parashivamurthy, Bangalore (IN); Halebeedu Prasanna Madhu, Bangalore (IN)

(73) Assignee: Robert Bosch GmbH, Stuttgart (DE)

( * ) Notice: Subject to any disclaimer, the term of this patent is extended or adjusted under 35 U.S.C. 154(b) by 357 days.

(21) Appl. No.: 18/249,002

(22) PCT Filed: Nov. 3, 2021

(86) PCT No.: PCT/EP2021/080444
§ 371 (c)(1),
(2) Date: Apr. 13, 2023

(87) PCT Pub. No.: WO2022/106195
PCT Pub. Date: May 27, 2022

(65) Prior Publication Data
US 2023/0322196 A1     Oct. 12, 2023

(30) Foreign Application Priority Data
Nov. 19, 2020 (DE) .................. 10 2020 214 600.4

(51) Int. Cl.
*B60T 13/74* (2006.01)
*B60T 7/08* (2006.01)

(52) U.S. Cl.
CPC ............ *B60T 13/748* (2013.01); *B60T 7/085* (2013.01)

(58) Field of Classification Search
CPC .................. B60T 13/748; B60T 7/085; G06F 11/00–3698
See application file for complete search history.

(56) References Cited

U.S. PATENT DOCUMENTS

| | | | |
|---|---|---|---|
| 5,335,174 A * | 8/1994 | Kohno | F16D 21/04 192/75 |
| 2014/0058642 A1 | 2/2014 | Bieltz et al. | |
| 2018/0234446 A1 | 8/2018 | Conner et al. | |

FOREIGN PATENT DOCUMENTS

| | | |
|---|---|---|
| DE | 103 55 997 B3 | 1/2005 |
| DE | 10 2004 060 454 A1 | 6/2006 |

(Continued)

OTHER PUBLICATIONS

International Search Report corresponding to PCT Application No. PCT/EP2021/080444, mailed Jan. 28, 2022 (German and English language document) (5 pages).

*Primary Examiner* — David R Morris
(74) *Attorney, Agent, or Firm* — Maginot, Moore & Beck LLP

(57) ABSTRACT

A control method for moving an electromechanical parking brake, according to which method an actuator of the parking brake is moved by actuation by means of an actuator-control unit, wherein a writable, non-volatile memory unit is provided in which position data concerning the current actuator position of the actuator is stored so as to be readable and writable, and according to which method, when a write error occurs while writing the position data to the memory unit, the actuation of the actuator for moving said actuator is continued, and, when the write error is detected, a synchronization process is carried out independently of the actuation of the actuator so that, upon completion of this synchronization process, the position data stored in the memory unit correctly represents the actuator position of the actuator.

9 Claims, 2 Drawing Sheets

(56) References Cited

FOREIGN PATENT DOCUMENTS

| | | |
|---|---|---|
| DE | 10 2018 103 181 A1 | 8/2018 |
| JP | 2007-216896 A | 8/2007 |
| JP | 2012-66814 A | 4/2012 |
| JP | 2016-22814 A | 2/2016 |
| JP | 2019-130938 A | 8/2019 |

* cited by examiner

CONTROL METHOD FOR MOVING AN ELECTROMECHANICAL PARKING BRAKE

This application is a 35 U.S.C. § 371 National Stage Application of PCT/EP2021/080444, filed on Nov. 3, 2021, which claims the benefit of priority to Serial No. DE 10 2020 214 600.4, filed on Nov. 19, 2020 in Germany, the disclosures of which are incorporated herein by reference in their entirety.

The present disclosure relates to a control method for moving an electromechanical parking brake and to a system which is configured or programmed to carry out said method.

BACKGROUND

Electromechanical parking brakes are used in state-of-the-art motor vehicles to prevent the parked vehicle from rolling away, in particular after being parked on a roadway with an inclined road surface. For this purpose, a controllable electrical actuator of the electromechanical parking brake can be moved to a locking position in the course of a locking procedure, in which a brake caliper that is fixedly connected to the actuator and comprises at least one brake pad blocks a rotational movement of the wheel by mechanical contact with a brake disc that is fixedly disposed on the wheel of the motor vehicle. In the course of an unlocking procedure of the parking brake, the actuator can be moved away from the locking position to an unlocking position, in which the brake caliper is disposed at a distance from the brake disc and thus releases the rotational movement of the wheel.

To ensure that brake control systems (hereinafter referred to as "brake control device") are compatible with electromechanical parking brakes from different manufacturers, it is known to control the movable actuator by means of a microcontroller (hereinafter referred to as "actuator control unit") that is specifically adapted to the respective actuator and thus to the electromechanical parking brake. To control the actuator by means of the brake control device via the actuator control unit, the brake control device and the actuator control unit are in communication with one another. Compatibility problems between the brake system and the actual electromechanical parking brake are thus avoided.

For correct actuation and movement of the actuator, it is customary to write the current actuator position to a non-volatile writable memory unit in the form of so-called position data, and to read it out again there as needed.

One common problem, however, is that write delays can occur when the position data is written to the memory unit, which can consequently also lead to an undesirable delayed actuation of the actuator by the actuator control unit. In such a case, the actuator control unit often reports an error to the brake control device if the write operation to the memory unit has taken too long and in particular could not be completed successfully within a specified time interval. Such an error message is then usually passed on to the driver of the motor vehicle by the brake control device. To clear this error message again from the error memory, it may be necessary for the driver of the motor vehicle with the parking brake to switch off the drive system (in vehicles with an internal combustion engine, the ignition) and switch it on again. Until then the movement of the actuator is blocked, so that the parking brake can in particular not be unlocked or locked during this time.

This is extremely inconvenient for the driver of the motor vehicle.

It is therefore an object of the present disclosure to create a method for actuating an electromechanical parking brake which addresses the problems discussed above.

This object is achieved by the subject matter of the independent claims. Preferred embodiments are the subject matter of the dependent claims.

SUMMARY

The underlying idea of the disclosure is therefore not to interrupt the actuation of the actuator of an electromechanical parking brake if a write error occurs when writing position data describing the current position of the actuator to a memory unit, but rather to continue the actuation of the actuator and thus its movement despite the error when writing the current position data of the actuator to the memory unit. It is proposed according to the disclosure that, if such a write error or delays in the write operation occur, a synchronization process be carried out in the memory unit at the same time as or after the actuation or movement of the actuator, so that, at the latest after the end of this synchronization process, it is ensured that the position data stored in the memory unit correctly describes the current actuator position of the actuator.

The aforementioned undesired error messages to the driver, triggered by errors or by delays when writing position data to the memory unit, are thus avoided. An undesirable interruption of the movement of the actuator is prevented as well. As a result, therefore, the movement of the actuator, as requested by the driver via the brake control device, can be carried out quickly and in particular without generating an error message to the driver. This leads to improved operational reliability when moving and thus also unlocking or locking the electromechanical parking brake.

In the control method according to the disclosure for moving an electromechanical parking brake, an actuator of the parking brake is moved by actuation by means of an actuator control unit. A writable, non-volatile memory unit is used for this purpose, in which position data relating to the current actuator position of the actuator is stored in a readable and writable manner. According to the method, when a write error or a write delay occurs while writing the position data to the memory unit, the actuation of the actuator for moving said actuator is not interrupted, but rather is continued. According to the disclosure, when the write error or the write delay is detected, a synchronization process is carried out independently of the actuation of the actuator, by means of which it is ensured that the position data stored in the memory unit correctly describes the actuator position of the actuator.

According to a preferred embodiment, the synchronization process takes place at the same time as the actuation or movement of the actuator. The movement process of the actuator is thus not interrupted, so that the vehicle can quickly be unlocked or locked with the electric parking brake. This in particular prevents undesirable delays when unlocking or locking the parking brake.

According to an advantageous further development, the method uses at least one marking parameter which characterizes the validity of the position data currently stored in the memory unit, which can assume a default value and at least one marking value that deviates from said default value. This makes it possible to determine and query at any time whether the position data stored in the memory unit correctly describes the current actuator position or not. This facilitates the correct implementation of the movement process of the actuator and also of the synchronization process for synchronizing the position data stored in the memory unit. This in particular avoids working with incorrect position data, which could lead to errors in the movement of the actuator.

According to an advantageous further development, the marking parameter is changed from the default value to a first or a second marking value if an error has occurred during a write operation of the position data to the memory unit. On the one hand, this makes it possible to recognize that the synchronization process essential to the disclosure still has to be carried out. On the other hand, reading out the first marking value makes it possible to recognize that the position data currently stored in the memory unit cannot be used until the synchronization process has been successfully completed, because, due to the error that occurred during the write operation of the position data, there is no guarantee that this data correctly describes the current actuator position of the actuator.

In the method according to the disclosure, the write operation is expediently classified as faulty and the marking parameter is changed to the first marking value at least if a predetermined maximum period of time for carrying out the write operation has been exceeded.

In the method according to the invention disclosure, the marking parameter is likewise expediently changed to the second marking value prior to the start of the write operation, to thus make it possible to detect an unexpected electrical interruption in the electrical power supply to the actuator.

According to an advantageous further development of the method, the first marking parameter is changed to the default value after the end of the write operation.

Since the marking parameter is set to the second marking value at the start of a write operation and reset to the default value after completion of the write operation, the presence of the second marking value at a time other than during a write operation, in particular when the marking parameter is queried at the start of the method, means that the write operation has been interrupted due to an interruption in the electrical power supply.

The disclosure further relates to a system comprising a controllable actuator for an electromechanical parking brake, which can be moved between a locking position and an unlocking position. The system comprises an actuator control unit for controlling the actuator. The system further comprises a brake control device for executing a computer program product, which communicates with the actuator control unit via a communication link. The system is configured and/or programmed to carry out the above-discussed method according to the disclosure, so that the above-discussed advantages of the method according to the disclosure apply likewise to the system according to the disclosure.

Further important features and advantages of the disclosure will emerge from the subclaims, from the drawing and from the associated description of the figures with reference to the drawings.

It goes without saying that the aforementioned features and the features yet to be explained in the following can be used not only in the respectively specified combination, but also in other combinations or on their own, without leaving the scope of the present disclosure.

Preferred embodiment examples of the disclosure are shown in the drawings and will be explained in more detail in the following description, wherein same reference signs refer to same or similar or functionally same components.

DETAILED DESCRIPTION

Figure 1:
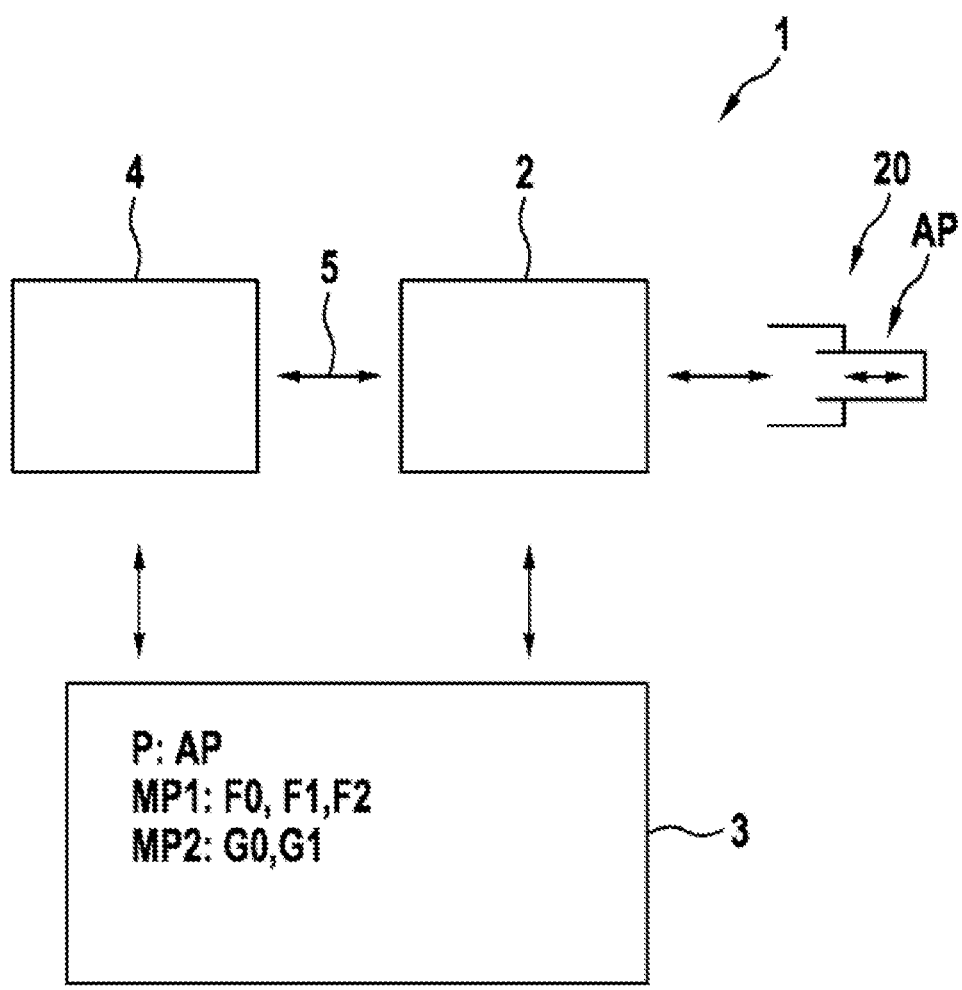
FIG. 1 an example of the structure of a system according to the disclosure.

FIG. 1 schematically illustrates the structure of a system 1 according to the disclosure. The system 1 comprises an actuator control unit 2, by means of which an actuator 20 of the parking brake not shown in more detail in FIG. 1 can be moved between different actuator positions. The actuator 20 can in particular be moved between a locking position and an unlocking position, wherein the actuator can in principle also be moved to any number of intermediate positions between the locking position and the unlocking position. The system 1 also comprises a writable, non-volatile memory unit 3. Position data P, which describes the actuator position AP currently occupied by the actuator 20, can be stored in the memory unit 3.

The system 1 also comprises a brake control device 4 in which a computer program product can be executed. In the present system, such a brake control device 4 can act as a so-called "host", which, among other things provides hardware required for operating the parking brake. The computer program product can be executed in the brake control device 4, by means of which the actuator 20 can be controlled indirectly (by actuation of the actuator control unit 2) and thus moved.

In the course of such an actuation of the actuator 20, the brake control device 4 and the actuator control unit 2 can communicate with one another via a communication link 5 and exchange data. This happens when the parking brake is to be locked and, to accomplish this, the actuator 20 has to be moved from the unlocking position to the locking position, for example. The computer program product executed in the brake control device 4 then requests such a movement of the actuator 20 from the actuator control unit 2 via communication link 5.

The current actuator position AP changes continuously as the actuator 20 is moved. The value of the current actuator position AP, which changes continuously during the movement, is written as position data P from the actuator control unit 2 to the memory unit 3.

In conventional systems, delays can occur in the write operation and, as a result, a delayed actuation of the actuator 20, because the movement of the actuator 20 does not take place independently of the writing of the current actuator position AP to the memory unit 3 and in particular not at the same time as this write operation.

Figure 2:
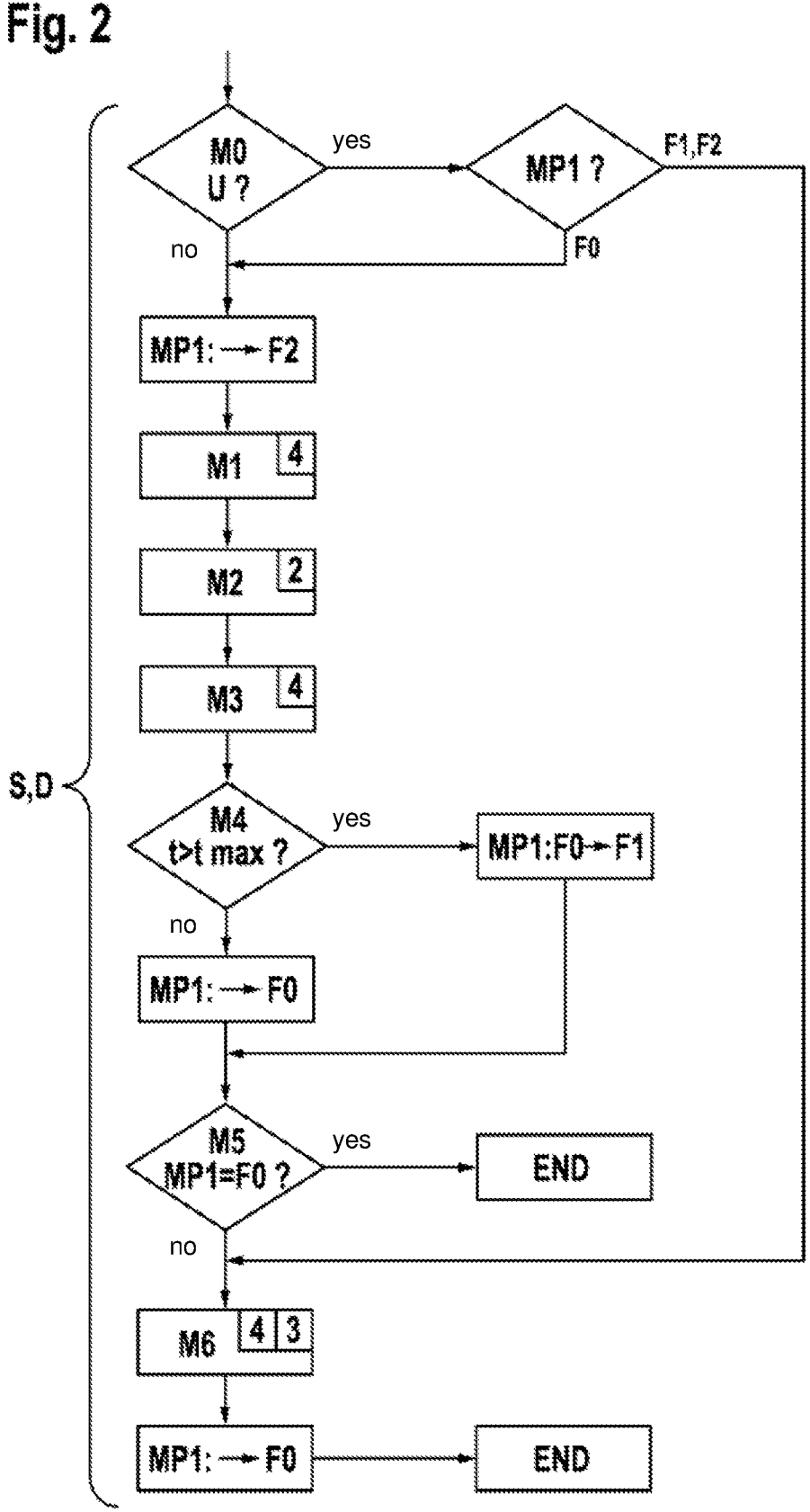
FIG. 2 a flowchart explaining the method according to the disclosure.

As shown in FIG. 2, which schematically illustrates a run D of the method according to the disclosure, in the method according to the disclosure the position data P stored in the memory unit 3 is synchronized independently of the movement of the actuator 20, i.e., the run D includes a synchronization process S for the position data P with the actual actuator position P of the actuator 20. Such a synchronization process S ensures that the position data P stored in the memory unit 3 correctly describes the actuator position AP. This also or in particular applies if there are delays in the write operation or errors in the write operation, for example because storing, i.e., saving, the position data P in the memory unit 3 is reorganized. In the method according to the disclosure, the position data P currently stored in the memory unit 3 is therefore updated while the actuation and thus the movement of the actuator 20 is continued. In particular if a write error occurs when writing the position data P to the memory unit 3, the actuation of the actuator 20 for movement by the actuator control unit 2 is not interrupted but is continued. The synchronization of the position data P and the actuation or movement of the actuator 20 can take place at the same time.

In the shown run D of the method, according to the example scenario of FIG. 2, a marking parameter MP1 is used, which, like the position data P, can be stored in the memory unit 3 in a readable and writable, i.e., changeable, manner and which characterizes the validity of the position data P currently stored in the memory unit 3. For this purpose, the marking parameter MP1 can have different values, specifically a default value F0 and two marking values which deviate from the default value F0—hereinafter referred to as the first and second marking value F1 and F2.

If there is no write error or at least no write error has been detected in the memory unit 3 and the most recently written position data P therefore correctly describes the current actuator position AP of the actuator 20, the marking parameter MP1 is set to the default value F0 in the course of the method. The first marking value F1, on the other hand, indicates that a time-out error has occurred during the write operation. Since the marking parameter MP1 is set to the second marking value F2 at the start of a write operation and reset to the default value F0 after completion of the write operation, the presence of the second marking value F2 at a time other than during a write operation, in particular when the marking parameter MP1 is queried at the start of the method, means that the write operation has been interrupted due to an interruption in the electrical power supply.

The aforementioned run D of the method according to the disclosure is now explained in more detail in the following with reference to the flowchart of FIG. 2. It goes without saying that the method can be carried out iteratively, wherein multiple runs D can be strung together. As an example, it is assumed that an internal combustion engine serves as the drive assembly of the motor vehicle.

At the start of the run D, a check is carried out according to a Measure M0 to determine whether an unexpected interruption U in the electrical power supply has occurred during the preceding ignition cycle of the internal combustion engine. If this is the case, the marking parameter MP1 is queried. If the query determines that said parameter has the value F0, the stored position data P are classified as valid.

If, on the other hand, the marking parameter MP1 is set to the first marking value F1, this means that, although there has been no interruption in the power supply, a write error has nevertheless occurred in the form of a time-out, and the stored position data P are classified as invalid. If the marking parameter MP1 is set to the second marking value F2, this means that an interruption U of the electrical power supply occurred in the preceding ignition cycle during the write operation of the position data P.

In this case, too, the position data P will be considered invalid.

If the preceding check according to Measure M0 shows that the marking parameter MP1 is set to the first or second marking value F1, F2, the method is continued with the yet-to-be-explained Measure M6, i.e., the measures M2 to M5 which are likewise yet to be explained are skipped.

If, on the other hand, the preceding check according to Measure M0 shows that the marking parameter MP1 is set to the default value F0, the marking parameter is set to the value F2, which means that a write operation will subsequently be carried out.

In a subsequent Measure M1, the brake control device 4 requests a moving movement of the actuator 20, for example from the unlocking position to the locking position, from the actuator control unit 2 via the communication link 5.

In response to Measure M1, in a Measure M2 following Measure M1, the brake control device 4 is requested by the actuator control unit 2 via the communication link 5 to adjust the position data P stored in the memory unit 3 in accordance with the change in the actuator position AP resulting from the movement of the actuator 20 which is carried out in the course of a Measure M3 of the method according to the disclosure following Measure M2.

In the course of a Measure M4 of the method which follows Measure M3, a check is carried out to find out whether an error has occurred during the write operation of the changed position data P to the memory unit 3. The write operation is classified as faulty if a predetermined maximum period of time $t_{max}$ for carrying out the write operation has been exceeded. If this is the case, the marking parameter MP1 is changed from the second marking value F2 to the first marking value F1 in the course of Measure M4 if an error occurred during the write operation of the changed position data P to the memory unit 3. If no error occurred during the write operation, the marking parameter MP1 is changed from the second marking value F2 to the default value F0 in the course of Measure M4.

Regardless of whether the write operation is classified as faulty or not, the actuation of the actuator 20 by the actuator control unit 2 is continued.

If no error is detected, the marking parameter MP1 is again reset to the default value F0 following Measure M4.

In a further Measure M5, the value of the marking parameter MP1 is queried. If it is found that said value is set to the default value F0, which means that the previously carried out write operation was able to be completed successfully and the stored position data P are valid, the current run D of the method is ended. If, on the other hand, the marking parameter MP1 is set to the first marking value F1 or to the second marking value MP2, the stored position data P are readjusted to the current actuator position AP in accordance with a further Measure M6, so that the position data P stored in the memory unit 3 are valid and correctly describe the current actuator position AP. The marking parameter MP1 is then set to the default value F0 and the method is ended.

The invention claimed is:

1. A control method for moving an electromechanical parking brake, according to which an actuator of the parking brake is moved by actuation using an actuator-control unit, wherein a writable, non-volatile memory unit is provided in which position data relating to a current actuator position of the actuator is stored in a readable and writable manner, comprising:
  detecting that a write error has occurred while writing the position data to the memory unit;
  continuing actuation of the actuator for moving said actuator when the write error is detected to have occurred; and,
  carrying out a synchronization process independently of the actuation of the actuator when the write error is detected to have occurred so that, upon completion of the synchronization process, the position data stored in the memory unit correctly describes the actuator position of the actuator.

2. The method according to claim 1, wherein the synchronization process takes place at the same time as the actuation of the actuator.

3. The method according to claim 1, wherein the method uses at least one marking parameter which characterizes a validity of the position data currently stored in the memory unit and which can assume a default value and at least one marking value that deviates from said default value.

4. The method according to claim 3, wherein the at least one marking parameter is changed from the default value to a first marking value or a second marking value if when an error has occurred during a write operation of the position data to the memory unit.

5. The method according to claim 4, wherein the write operation is classified as faulty and the at least one marking parameter is changed to the first marking value when a predetermined maximum period of time for carrying out the write operation has been exceeded.

6. The method according to claim 4, wherein the at least one marking parameter is changed to the second marking value prior to the start of the write operation, so as to detect an unexpected electrical interruption in the electrical power supply to the actuator.

7. The method according to claim 6, wherein the at least one marking parameter is changed to the default value after the end of the write operation.

8. The method according to claim 3, wherein, at the start of the method, the at least one marking parameter is queried to check whether valid position data is available in the memory unit and, if no valid position data is available, the saved position data is adjusted to match the current actuator position.

9. A system, comprising:
a controllable actuator for an electromechanical parking brake, which can be moved between a locking position and an unlocking position;
an actuator control unit configured to control the actuator; and,
a brake control device configured to execute a computer program product, which communicates with the actuator control unit via a communication link,
wherein the system is configured/programmed to
detect that a write error has occurred while writing the position data to the memory unit;
continue actuation of the actuator for moving said actuator when the write error is detected to have occurred; and
carry out a synchronization process independently of the actuation of the actuator when the write error is detected to have occurred so that, upon completion of the synchronization process, the position data stored in the memory unit correctly describes the actuator position of the actuator.

* * * * *